UNITED STATES PATENT OFFICE.

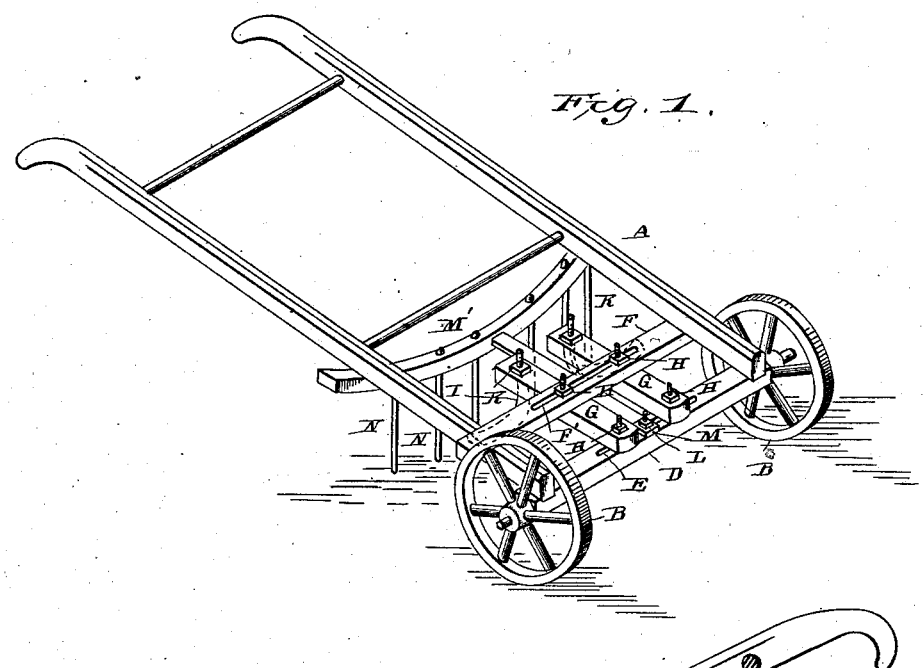
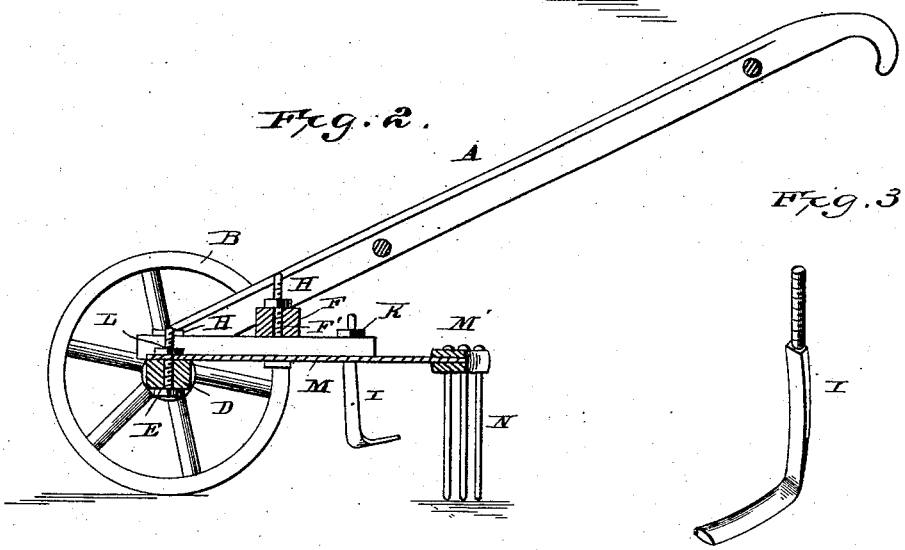

MYRON H. FULLER, OF PHELPS, NEW YORK, ASSIGNOR OF ONE-HALF TO E. G. CARPENTER, OF SAME PLACE.

WEEDING-MACHINE.

SPECIFICATION forming part of Letters Patent No. 266,956, dated October 31, 1882.

Application filed July 12, 1882. (No model.)

*To all whom it may concern:*

Be it known that I, MYRON H. FULLER, of Phelps, in the county of Ontario, and in the State of New York, have invented certain new and useful Improvements in Weeding-Machines; and I do hereby declare that the following is a full, clear, and exact description thereof, reference being had to the accompanying drawings, and to the letters of reference marked thereon, making a part of this specification.

This invention relates to certain improvements in weeding machines; and it has for its objects to provide an apparatus which may be employed to destroy either one or two rows of weeds simultaneously, as more fully hereinafter specified. These objects I attain by the machine illustrated in the accompanying drawings, in which—

Figure 1 represents a perspective view of my improved weeding-machine, Fig. 2 a longitudinal sectional view thereof, and Fig. 3 a detached view of one of the cutters.

The letter A indicates a frame or truck, mounted on two wheels, B. D indicates the axle of the truck, which is slotted longitudinally, as indicated by the letter E. The truck or frame is provided with a cross-bar, F, slotted at F' similarly to the axle, and to the axle and bar respectively are secured the beams G by means of the screw bolts and nuts H, in such manner that the said beams may be adjusted with respect to each other and to the truck or frame. The beams are provided with knives or cutters I at their rear ends, the standards or shanks of such knives being screw-threaded and passing through the ends of the beams, being secured therein by means of the nuts K. The axle D has secured to it by means of a bolt and nut, L, a spring-beam, M, carrying a curved rake-head, M', provided with vertical rake-teeth N. The said rake-beam extends backward between the beams G, the rake being located immediately to the rear of the knives or cutters. The forward ends of the beams G project slightly in front of the axle, so as to serve as pointers or guides to enable the operator to direct the movement of the apparatus when weeding two rows.

The operation of my invention is as follows: When it is intended to weed a single row the beams G are brought together at their rear ends, so as to cause the knives or cutters to approach each other, and are clamped by means of their respective screw-bolts. When two rows are to be weeded the rear ends of the beams G are set so as to diverge, the forward ends converging, and the said beams are then tightened by means of the bolt, as before. In either case, after the parts have been properly adjusted, the apparatus is traversed over the ground by any suitable means, the knives cutting the weeds and the rakes clearing away the debris.

Having thus described my invention, what I claim, and desire to secure by Letters Patent, is—

In a weeding-machine, the combination of the axle D, having a longitudinal slot, E, the frame A secured thereto, and provided with the slotted cross-bar F, the spring-bar M, carrying the backwardly-curved rake-head M', the beams G, carrying the cutters I, and the adjusting-screws and nuts H, the whole arranged to operate substantially in the manner specified.

In testimony whereof I affix my signature, in presence of two witnesses, this 19th day of June, 1882.

MYRON H. FULLER.

Witnesses:
W. B. HOTCHKISS,
C. H. MYERS.